(12) United States Patent
Haiberger

(10) Patent No.: US 10,785,359 B2
(45) Date of Patent: Sep. 22, 2020

(54) LIGHTING DEVICE FOR A MOBILE TERMINAL

(71) Applicant: OSRAM OLED GmbH, Regensburg (DE)

(72) Inventor: Luca Haiberger, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 16/315,448

(22) PCT Filed: Jul. 18, 2017

(86) PCT No.: PCT/EP2017/068156
§ 371 (c)(1),
(2) Date: Jan. 4, 2019

(87) PCT Pub. No.: WO2018/015399
PCT Pub. Date: Jan. 25, 2018

(65) Prior Publication Data
US 2019/0312964 A1   Oct. 10, 2019

(30) Foreign Application Priority Data

Jul. 19, 2016   (DE) .................. 10 2016 113 269

(51) Int. Cl.
*H04M 1/02* (2006.01)
*H04M 1/22* (2006.01)
*H04N 5/225* (2006.01)

(52) U.S. Cl.
CPC ........... *H04M 1/22* (2013.01); *H04M 1/0202* (2013.01); *H04M 1/026* (2013.01); *H04N 5/2256* (2013.01)

(58) Field of Classification Search
CPC ............ H04M 1/0202; H04M 1/0264; H04M 1/0279; H04M 2250/16; H04M 2250/22;
(Continued)

(56) References Cited

U.S. PATENT DOCUMENTS 7,340,125 B1 *   3/2008   Doty ................. G02B 6/3574
                                                     385/140
7,460,091 B2   12/2008   Suzuki
(Continued)

FOREIGN PATENT DOCUMENTS

CN   101326731 A   12/2008
CN   100521848 C    7/2009
(Continued)

*Primary Examiner* — Nathan S Taylor
(74) *Attorney, Agent, or Firm* — Slater Matsil, LLP

(57) ABSTRACT

A lighting device for a mobile terminal is disclosed. In an embodiment the lighting device includes a light-emitting component comprising a light-emitting semiconductor element and a first light emission face and a second light emission face, the light-emitting component configured to emit light radiation, a first optical waveguide for guiding the light radiation via the first light emission face to a first radiation element, a second optical waveguide for guiding the light radiation via the second light emission face to a second radiation element and at least one optical switch arranged in a region of the first light emission face or the second light emission face for controlling a quantity of light emitted from the light-emitting component via the respective light emission face.

18 Claims, 7 Drawing Sheets

(58) Field of Classification Search
CPC ...... H04M 1/22; H04M 1/026; H04N 5/2256; G02B 6/0055; G02B 6/0076; G02B 6/0068; G02B 6/0088
USPC ................. 345/76; 362/249.01, 249.02, 609; 455/575.8
See application file for complete search history.

(56) References Cited

U.S. PATENT DOCUMENTS

| | | | | |
|---|---|---|---|---|
| 2003/0125080 A1* | 7/2003 | Shimamura | ......... | H04M 1/0214 455/556.1 |
| 2003/0152358 A1* | 8/2003 | Ormos | ................. | G02F 1/0126 385/145 |
| 2004/0132491 A1* | 7/2004 | Kim | ................... | H04M 1/0218 455/556.1 |
| 2005/0062693 A1* | 3/2005 | Suzuki | ................. | G09G 3/3216 345/76 |
| 2005/0243243 A1 | 11/2005 | Koganezawa | | |
| 2006/0221013 A1* | 10/2006 | Kimura | ................ | G09G 3/3233 345/76 |
| 2007/0031097 A1* | 2/2007 | Heikenfeld | ............ | G02B 26/02 385/129 |
| 2007/0147725 A1* | 6/2007 | Crespi | ................... | G02F 1/3132 385/9 |
| 2008/0171571 A1* | 7/2008 | Feil | ........................ | G03B 17/17 455/556.1 |
| 2009/0002976 A1* | 1/2009 | Schulz | ..................... | G02F 1/25 362/84 |
| 2010/0177025 A1* | 7/2010 | Nagata | ................. | G02B 6/0028 345/76 |
| 2010/0271841 A1* | 10/2010 | Kim | ..................... | G02B 6/0031 362/607 |
| 2013/0286682 A1* | 10/2013 | Lin | ...................... | G02B 6/0055 362/609 |
| 2013/0307831 A1* | 11/2013 | Robinson | ............. | G02B 6/0048 345/207 |
| 2014/0024690 A1 | 1/2014 | Abramite et al. | | |
| 2014/0246690 A1 | 9/2014 | Moosburger et al. | | |
| 2015/0037030 A1* | 2/2015 | Cho | ....................... | G02F 1/025 398/48 |
| 2015/0070929 A1 | 3/2015 | Weissenberger et al. | | |
| 2015/0256655 A1* | 9/2015 | Jannard | ............... | H04M 1/0202 455/575.8 |
| 2016/0300092 A1* | 10/2016 | Gifford | .............. | G06K 7/10821 |
| 2016/0351761 A1* | 12/2016 | David | .................. | H01L 33/508 |
| 2017/0045203 A1* | 2/2017 | Mao | ........................ | G02F 1/31 |

FOREIGN PATENT DOCUMENTS

| | | |
|---|---|---|
| CN | 102720995 A | 10/2012 |
| CN | 104246355 A | 12/2014 |
| WO | 2008084892 A1 | 7/2008 |

* cited by examiner

LIGHTING DEVICE FOR A MOBILE TERMINAL

This patent application is a national phase filing under section 371 of PCT/EP2017/068156, filed Jul. 18, 2017, which claims the priority of German patent application 102016113269.1, filed Jul. 19, 2016, each of which is incorporated herein by reference in its entirety.

TECHNICAL FIELD

The invention relates to a lighting device for a mobile terminal for radiating light on the front and rear sides of the terminal. The invention furthermore also relates to the mobile terminal comprising such a lighting device.

BACKGROUND

In mobile terminals, light is used for different lighting functions, e.g., as flashlight or for display backlighting. At present different light-emitting diodes (LEDs) are used for the different lighting functions. In this regard, by way of example, both on the front side and on the rear side of a mobile telephone or smartphone, light-emitting diodes are provided for illuminating the respective region. In this case, the light-emitting diodes serve principally as camera light, i.e., flashlight or video light, for brightening a scene captured by the front-side and/or rear-side smartphone camera. By way of example, two toplooker LEDs mounted in opposite directions are used for the two camera lights. In a manner governed by the application, said LEDs may be two LEDs of the same type or different types.

In the case of modern smartphones, a significant increase in performance with at the same time a smaller housing thickness may be ascertained with each new generation. In this case, more and more functions and/or components have to be accommodated in an increasingly limited space. Therefore, there is a need to reduce the size of existing components or to combine a plurality of separate functions in a common component.

SUMMARY OF THE INVENTION

Embodiments provide a lighting device which combines different functions of a mobile terminal. Embodiments provides a lighting device for a mobile terminal, comprising a light-emitting component comprising a first and a second light emission face, a first optical waveguide apparatus for guiding the light radiation emitted from the light-emitting component via the first light emission face to a first radiation element, and a second optical waveguide apparatus for guiding the light radiation emitted from the light-emitting component via the second light emission face to a second radiation element. The light-emitting component furthermore also comprises an optical switching apparatus arranged in the region of one of the light emission faces for controlling the quantity of light emitted from the light-emitting component via the respective light emission face. Two lighting functions of the mobile terminal may be combined by the use of a single light-emitting component. In this case, the light-emitting component replaces the two light-emitting components usually used separately for the lighting functions. Consequently, the structural volume of the lighting device may be significantly reduced, without a limitation of the functionality occurring. With the aid of one optical switching apparatus, the ratio of the light radiation emitted via the relevant light emission face may in this case be altered in comparison with the light radiation emitted via the respective other light emission face. It is thus possible to operate the lighting device even with a deactivated lighting function.

One embodiment provides for a first optical switching apparatus for controlling the quantity of light emitted from the light-emitting component via the first light emission face to be arranged between the first light emission face and the first optical waveguide apparatus. Furthermore, provision is made for a second optical switching apparatus for controlling the quantity of light emitted from the light-emitting component via the second light emission face to be arranged between the second light emission face and the second optical waveguide apparatus. As a result, it is possible to operate the two lighting functions entirely independently of one another.

A further embodiment provides for at least one of the optical waveguide apparatuses to be configured in the form of an electrically switchable mirror. The use of an electrically switchable mirror increases the efficiency of the lighting device since light radiation is reflected back from an optical switching apparatus switched to be inactive, that is to say reflective, and is thus radiated via the radiation element assigned to the active optical switching apparatus.

A further embodiment provides for at least one of the optical waveguide apparatuses to comprise an optical waveguide element arranged between the light emission face assigned to the respective optical waveguide apparatus and the radiation element of the respective optical waveguide apparatus. With the aid of an optical waveguide element it is possible to guide light radiation effectively from the light-emitting component to the light emission face. In this case, even relatively large distances and non-straight or winding light paths may be surmounted effectively and without significant power losses. There is thus no need to mount the light-emitting component in direct proximity to the radiation elements. This enables a better utilization of the structural space available in the mobile terminal, even if the structural space comprises a complex geometry.

A further embodiment provides for one of the light emission faces to comprise a semitransparent coating that reduces the quantity of light emitted via the respective light emission face. With the aid of the semitransparent coating, the light intensity of the lighting function realized with the respective light emission face may be reduced since less light emerges through the relevant light emission face. It is thus possible in turn to achieve a weighting of the different lighting functions, e.g., a front-side camera light comprising greater luminous intensity by comparison with the rear-side camera light.

A further embodiment provides for the light emission faces to be configured to be of different sizes. The abovementioned weighting of the lighting functions realized by means of the two optical switching apparatuses may be achieved even with the aid of light emission faces comprising different sizes.

A further embodiment provides for the light-emitting component to comprise a scattering volume, wherein the two light emission faces are constituted by two different side faces of the scattering volume. With the aid of such a scattering volume, the light radiation emitted by the light-emitting component may be distributed particularly efficiently between the two optical waveguide apparatuses. In this regard, light radiation is reflected back and forth in the scattering volume until it leaves the scattering volume via one of the light emission faces. The arrangement of the light emission faces on different side faces of the scattering volume facilitates the arrangement of the radiation elements on opposite sides of the mobile terminal.

A further embodiment provides for the light-emitting component to comprise a scattering volume, wherein the two light emission faces constitute a common side face of the scattering volume. A particularly space-saving design of the light-emitting component may be achieved as a result.

A further embodiment provides for a reflector comprising a reflective material to be provided, which reflector partly surrounds the scattering volume and limits the light emission to the light emission faces. The luminous efficiency of the light radiation emitted from the scattering volume via the light emission faces may be increased by the use of such a reflector.

A further embodiment provides for the reflector to be constituted from a silicone comprising embedded titanium oxide. The production of such a reflector is particularly simple and moreover cost-effective as well.

A further embodiment provides for the first radiation element to constitute a front-side camera light of the mobile terminal, and for the second radiation element to constitute a rear-side flashlight of the mobile terminal. The use of the light-emitting component for realizing a front- and rear-side camera light is particularly advantageous since these camera lights are typically used in each case as an alternative to one another. For this reason, a normally dimensioned LED may be used as light-emitting semiconductor element.

A further embodiment provides for the light-emitting semiconductor element to be configured in the form of an LED comprising a semiconductor chip arranged on a substrate and surrounded by an outer enclosure comprising a conversion material, wherein the outer enclosure constitutes the scattering volume. This construction is particularly well suited to the use of LEDs comprising volume-emitting chips.

A further embodiment provides for the light-emitting semiconductor element to be configured in the form of an LED comprising a semiconductor chip arranged on a substrate with a conversion element arranged on said semiconductor chip. In this case, the scattering volume is configured in the form of a scattering body arranged on the conversion element. This configuration is particularly well suited to the use of surface-emitting LED chips.

A further embodiment provides a mobile terminal comprising a housing and a lighting device arranged in the housing. In this case, the first radiation element constitutes a camera light arranged on the front side of the mobile terminal. In this case, the second radiation element constitutes a camera light arranged on the rear side of the housing. A particularly small housing thickness of the mobile terminal may be achieved by the use of the lighting device for realizing the front- and rear-side camera light function.

One embodiment provides for the mobile terminal furthermore to comprise a control apparatus configured to control the quantity of light radiated by the radiation elements individually for each radiation element. With the aid of such a control apparatus, the camera light functions of the mobile terminal may be controlled individually and independently of one another.

BRIEF DESCRIPTION OF THE DRAWINGS

The above-described properties, features and advantages of this invention and the way in which they are achieved will become clearer and more clearly understood in association with the following description of the exemplary embodiments which are explained in greater detail in association with the drawings, wherein.

DETAILED DESCRIPTION OF ILLUSTRATIVE EMBODIMENTS

Figure 1:
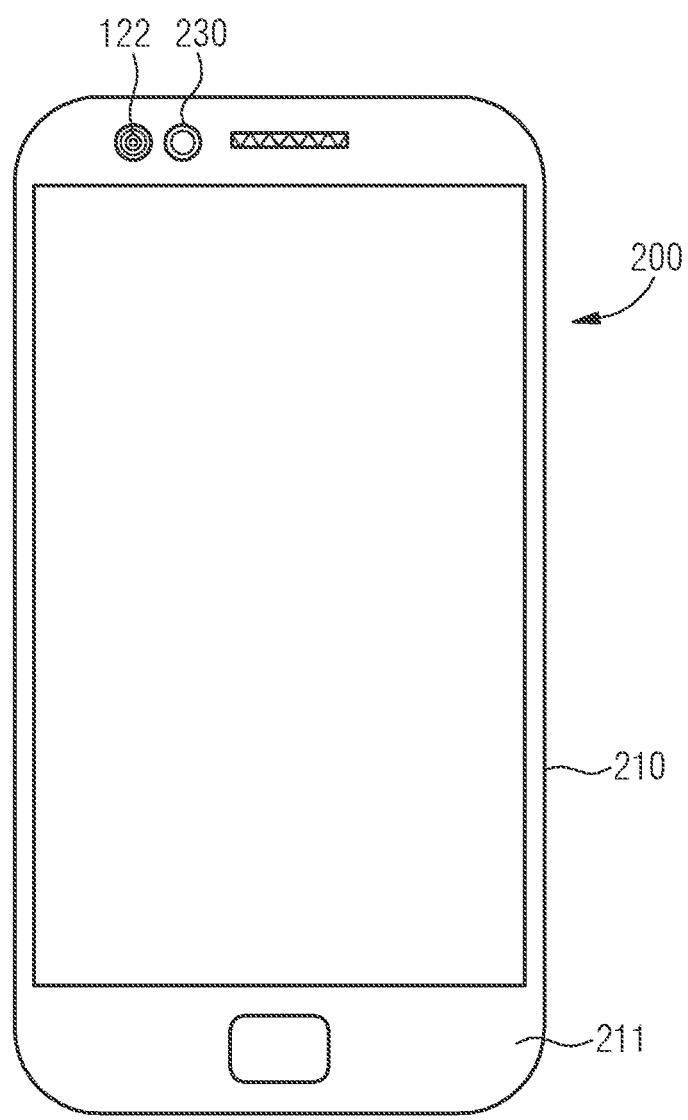
FIG. 1 shows a front view of a mobile terminal comprising a front-side flashlight function.
Figure 2:
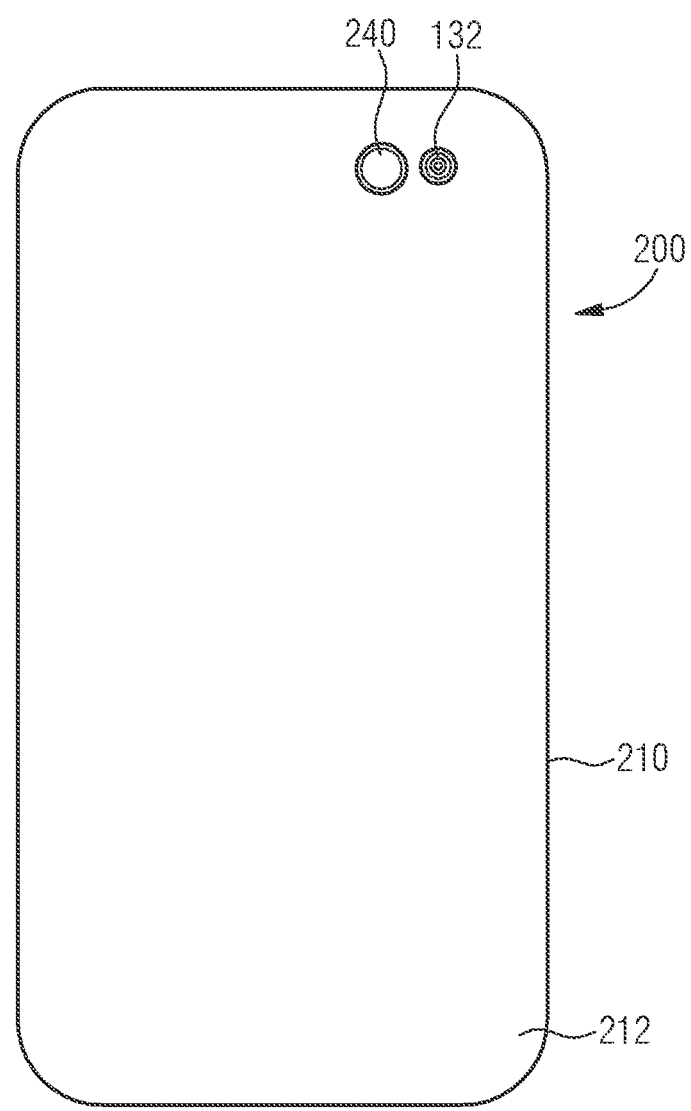
FIG. 2 shows the rear side of the mobile terminal from FIG. 1 comprising a rear-side flashlight function.

FIG. 1 shows the front side of a mobile terminal 200 configured in the form of a mobile telephone or smartphone. The mobile terminal 200 comprises on its front side a camera 230 and also a luminaire 122 serving as camera light, i.e., flashlight or video light. According to embodiments of the invention, the luminaire 122 is part of a lighting device of the mobile terminal, said lighting device also comprising a rear-side lighting function of the mobile terminal 200 besides the front-side lighting function. As is evident from FIG. 2, on the rear side 212 of the mobile terminal 200, too, a rear-side luminaire 132 serving as flashlight or video light is also arranged next to a camera 240.

Figure 3:
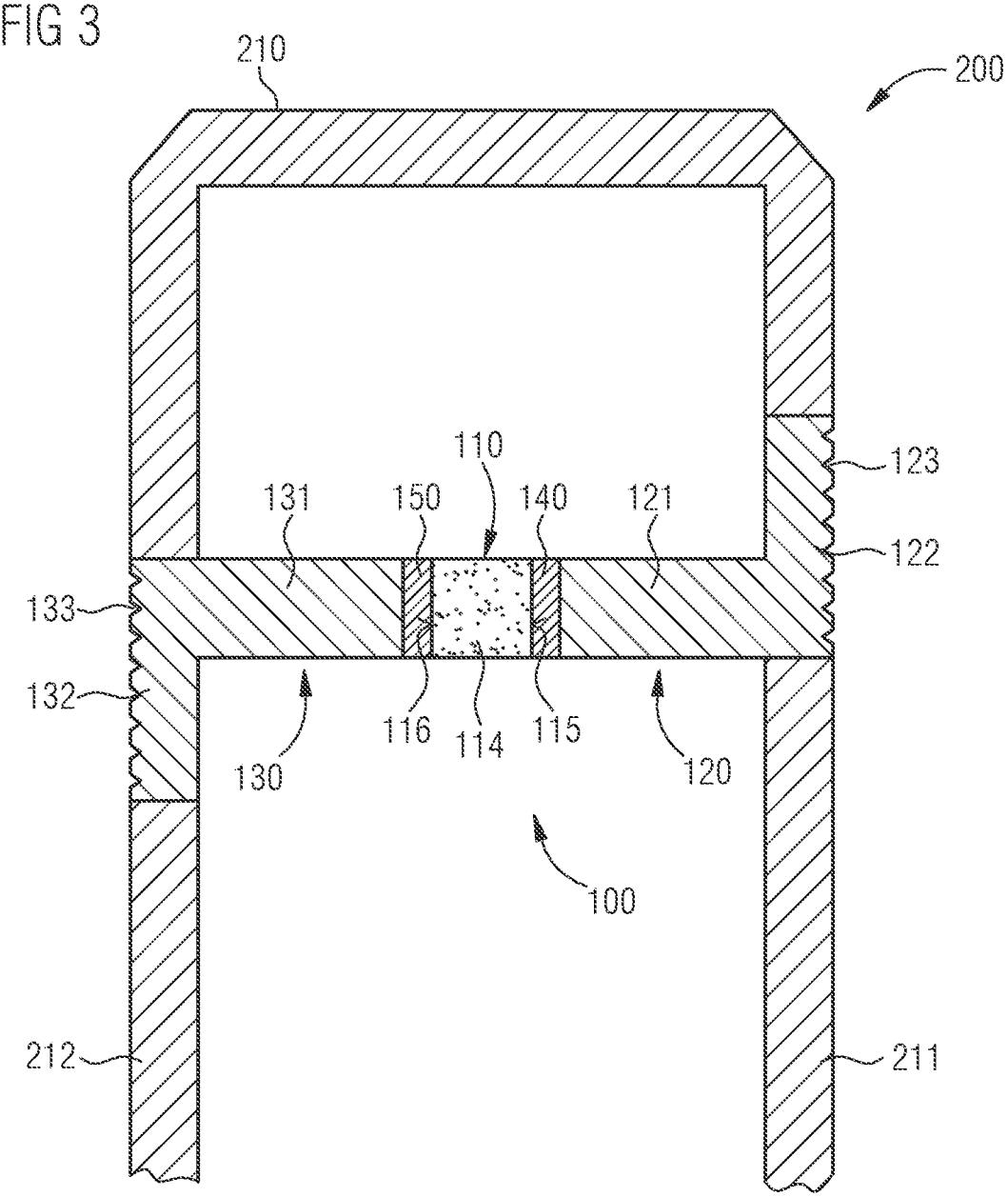
FIG. 3 schematically shows a cross section through the mobile terminal from FIGS. 1 and 2 comprising a light-emitting lighting device constituting the front-side and the rear-side flashlight function.

According to embodiments of the invention, the two luminaires 122, 132 are part of a common lighting device. In this respect, FIG. 3 shows a cross section through the housing 210 of the mobile terminal 200. As may be seen in this schematic illustration, the lighting device 100 comprises a light-emitting component 110 for generating a light radiation and two optical waveguide apparatuses 120, 130 arranged at the light-emitting component no for guiding the light radiation generated by the common light-emitting component no to the front and rear sides 211, 212 of the mobile terminal 200. In this case, the light-emitting component 110 comprises an optoelectronic semiconductor chip (not shown here), which generates a light radiation, and a scattering volume 114, which scatters the light radiation in different directions. In the present exemplary embodiment, the scattering volume 114 comprises a square or rectangular profile comprising two light emission faces 115, 116 arranged opposite one another, the light radiation being emitted from the scattering volume 114 via said light emission faces.

In order to increase the efficiency of the lighting device 100, the other side walls of the scattering volume 114, which is preferably configured in the form of a cube or parallelepiped, are in this case preferably surrounded with a reflective or reflecting material (not shown here). As is furthermore evident from FIG. 3, the two optical waveguide apparatuses 120 comprise an optical waveguide element 121, 131 and also a radiation element 122, 132 connected thereto. In this case, an input-side end of the two optical waveguide elements 121, 131 respectively faces one of the two light emission faces 115, 116 of the scattering volume 114 in order to relay the light radiation emitted via the light emission faces 115, 116 to the radiation elements 122, 132. In this case, the two radiation elements 122, 132 are arranged on opposite sides of the mobile terminal 200 in housing openings and constitute the two luminaires from FIGS. 1 and 2. As is shown here, the two radiation elements 122, 132 may in this case comprise structured surfaces that serve for beam shaping and are configured, for example, in the form of a Fresnel lens.

As is furthermore shown in FIG. 3, the common light-emitting component 110 serves as a common light source for the two luminaires 122, 132. In order to separately activate the lighting functions realized by way of the front-side luminaire 122 and the rear-side luminaire 132, individually drivable optical switching apparatuses may be present at the light emission faces 115, 116 of the light-emitting component 110, which optical switching apparatuses control the quantity of light emitted via the respective light emission face 115, 116. As shown in FIG. 3, in the following exemplary embodiment, a respective optical switching apparatus 140, 150 is provided at each of the two light emission faces 115, 116. In this case, the optical switching apparatuses used are preferably electrically switchable mirrors whose transparency and reflectivity may be set in a desired manner by means of an electrical signal. In principle, however, other electrically switchable optical components are also suitable as electrical switching devices, such as a liquid-crystal-based electro-optical switch, for example. In this case, besides the active state "transparent" and the non-active state "nontransparent", such an optical switch may also comprise at least one active intermediate state "semitransparent".

Figure 4:
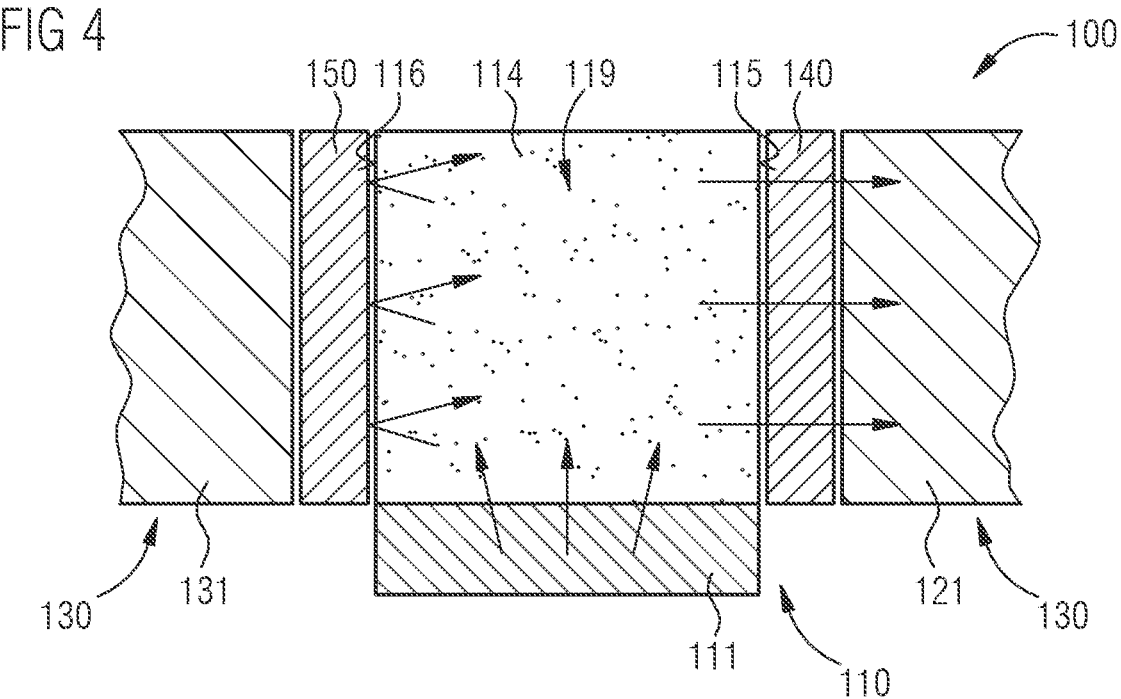
FIG. 4 shows a schematic detail illustration of the lighting device from FIG. 3 comprising an activated front-side flashlight function.

FIG. 4 shows a detail view of the lighting device 100 from FIG. 3. In this case, the illustration also shows a light-emitting semiconductor element iii arranged at the scattering volume 114 and configured, for example, in the form of an LED. The light-emitting semiconductor element 111 emits a light radiation into the scattering volume 114. The scattering volume 114 consists of a material that brings about volume scattering. This may be carried out, for example, by embedding scattering particles 119 into an otherwise transparent material. As an alternative thereto, opaque and/or translucent materials may also be used, which bring about volume scattering even without specific scattering particles.

The light radiation emitted into the scattering volume 114 by the light-emitting semiconductor element 111 is scattered in all directions in the scattering volume 114, wherein scattered light also reaches the two light emission faces 115, 116. In this case, the fact of whether the scattered light radiation leaves the scattering volume 114 via one of the light emission faces 115, 116 in the direction of an optical waveguide element 121, 131 disposed optically downstream of the scattering volume 114 depends in particular on the current switching state of the optical switching apparatus 140, 150 arranged at the respective light emission face 115, 116. In the exemplary embodiment shown here, the optical switching apparatuses 140, 150 are configured in the form of electrically switchable mirrors, wherein the first optical switching element 140 is switched to be active or transparent, while the second optical switching element 116 is switched to be inactive and is thus nontransparent or reflective. Consequently, the light radiation scattered in the direction of the first light emission face 115 passes via the active optical switching element 140 into the downstream optical waveguide element 121 of the first optical waveguide apparatus 120. By contrast, the light radiation scattered in the direction of the second light emission face 116 is reflected back into the scattering volume 114 by the non-active and therefore reflective second optical switching apparatus 150. The reflected light radiation may then leave the scattering volume 114 via the first light emission face 115, if appropriate after it has been repeatedly scattered and/or reflected in the scattering volume.

Figure 5:
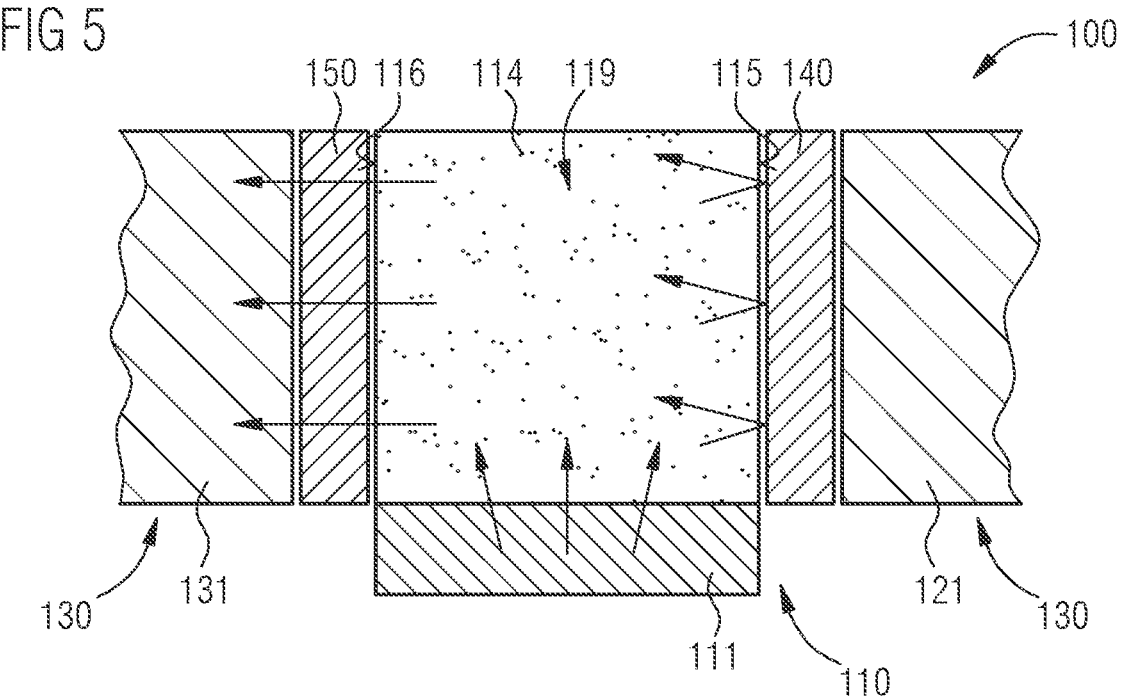
FIG. 5 shows a schematic detail illustration of the lighting device from FIG. 3 comprising the activated rear-side flashlight function.

FIG. 5 shows the lighting device 100 from FIG. 4 in an operating state in which the first optical switching apparatus 140 is deactivated, while the second optical switching apparatus is in an activated state. In contrast to the operating state shown in FIG. 4, the light emitted into the scattering volume 114 by the light-emitting semiconductor element 111 is coupled via the second optical switching element 150 into the second optical waveguide element 131 of the rear-side optical waveguide apparatus 130. By contrast, light radiation is reflected back into the scattering volume 114 again by the inactive first optical switching apparatus 140. In the two operating situations from FIGS. 4 and 5, in each case only one of the two lighting functions is activated. In principle, however, it is also possible to activate both lighting functions simultaneously. In this case, both the front-side and the rear-side camera light 122, 132 of the mobile terminal 200 is activated. As necessary, the light-emitting semiconductor element 111 in this case may also be operated with higher light power. Furthermore, it is also possible to operate one of the two lighting functions with a lower light power than the second lighting function. This is the case for the front-side camera light 122, for example, which typically has to illuminate photographed objects only at a short distance (e.g., arm's length) and moreover also obtains support from the display lighting. For this purpose, in the operating situation from FIG. 5, the first optical switching apparatus 140 may be activated with a semitransparent intermediate state, such that light emitted from the scattering volume 114 in the direction of the first light emission face 115 is only partly reflected back and partly transmitted by the optical switching apparatus 140. In order to achieve such attenuated illumination for the front-side camera light 122, the first light emission face 115 may alternatively also be provided with a semireflective coating. Furthermore, an illuminance comprising different magnitudes on the front side 211 and the rear side 212 of the mobile terminal 200 may also be achieved with the aid of light emission faces 115, 116 configured in different sizes.

Figure 6:
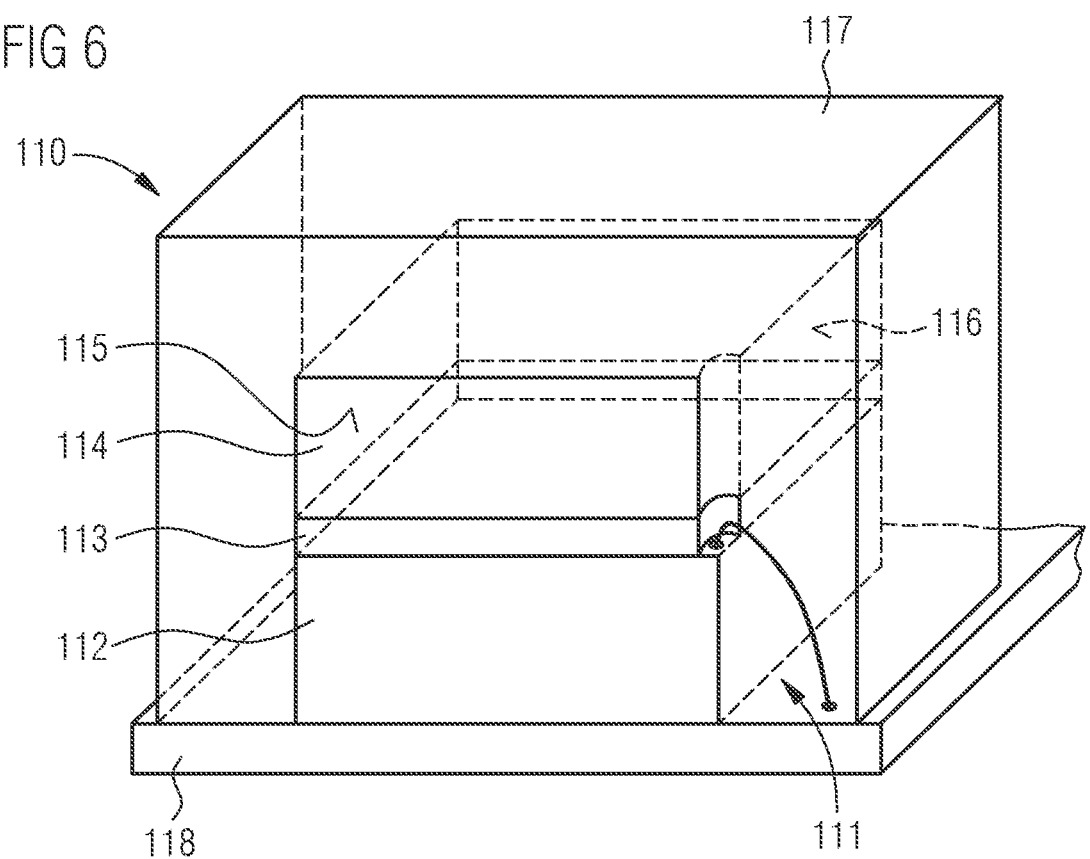
FIG. 6 schematically shows a perspective illustration of the light-emitting component from FIGS. 4 and 5.

FIG. 6 shows by way of example a light-emitting component no comprising a light-emitting semiconductor element 111 and a scattering volume 114 arranged thereon. In this case, the light-emitting semiconductor element 111 used is a light-emitting diode of a typical design comprising a semiconductor chip 111 arranged on a substrate 118 and a conversion layer 113 arranged on the semiconductor chip. The semiconductor chip 112 emits a short-wave light radiation, which is converted in the conversion layer 113 at least partly into light radiation of one or more longer wavelengths. In this case, the resulting light radiation is emitted via the conversion layer 113 into the scattering volume 114, where, after scattering and reflection at the side walls of the scattering volume 114 that are configured to be reflective, said light radiation finally emerges from the light-emitting component no via at least one of the light emission faces 115, 116 of the scattering volume 114.

As is furthermore shown in FIG. 6, the scattering volume 114 is surrounded by a reflector 117 comprising a reflective material. In this case, the reflector 117 extends on the top side and also on two side faces of the scattering volume 114, such that only the two light emission faces 115, 116 of the scattering volume 114 remain free. In the present exemplary embodiment, the reflector 117 extends as far as the substrate 118, wherein the side walls of the semiconductor chip 112 and of the conversion layer 113 are also covered by the reflective material. In principle, any reflective material, such as a mixture of silicone and titanium dioxide ($TiO_2$), for example, is suitable as material for the reflector 117.

As is furthermore evident from FIG. 6, the light-emitting semiconductor element comprises a bond wire connection that connects the top side of the semiconductor chip 112 to a conductor structure on the substrate surface, said conductor structure not being illustrated in more specific detail. As is evident here, the conversion layer 113 comprises a cutout in the region of the bond wire. Said cutout may, like the case in the present exemplary embodiment, also be formed within the scattering volume 114. The effective width of the front light emission face 115 of the scattering volume 114 is reduced by such a cutout, as a result of which the first light emission face 115 turns out to be smaller overall than the second light emission face 116. A reduction of the luminous intensity of the front-side camera luminaire in comparison with the rear-side camera luminaire is achieved as a result.

In principle, it is also possible for conversion material also to be used in the scattering volume 114, such that the separate conversion layer 113 may be dispensed with. In this case, the scattering volume 114 serving as convertor bears directly on the semiconductor chip 112.

Figure 7:
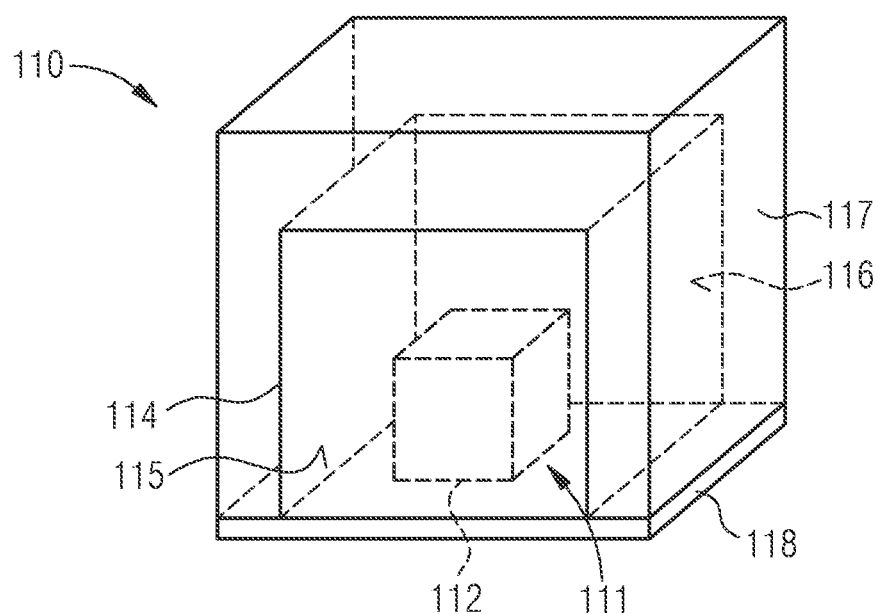
FIG. 7 schematically shows a perspective view of an alternative configuration of the light-emitting component comprising a volume-emitting LED chip.

In principle, the light-emitting component no may also be realized with light-emitting diodes of a different design, for example, by means of a light-emitting diode comprising a volume-emitting semiconductor chip. In this case, the volume-emitting semiconductor chip may be configured, for example, as a so-called flip-chip or sapphire chip. In this respect, FIG. 7 shows an alternative configuration of the light-emitting component no comprising a semiconductor chip 112 arranged on a substrate 118, said semiconductor chip being completely surrounded by a scattering volume 114 consisting of conversion material or containing conversion material. In the present exemplary embodiment, the semiconductor chip 112 realized with flip-chip design, for example, is configured in cubic or parallelepipedal fashion. The scattering volume 114, likewise configured in cubic or parallelepipedal fashion, surrounds the semiconductor chip 112 in the form of an enclosure along its four side walls and its cover wall. In this case, the scattering volume 114 is surrounded with a reflective material constituting a reflector 117. In this case, the reflector 117 covers two of the four side walls and the cover wall of the scattering volume 114, such that the two light emission faces 115, 116 of the scattering volume 114 remain free. In the case of a light-emitting component no configured in this way, at least part of the light radiation emitted by the semiconductor chip 112 with a short wavelength is converted into light radiation of at least one longer wavelength by the conversion material contained in the scattering volume 114. In this case, the light radiation is scattered back and forth within the scattering volume 114 or reflected back and forth at the side walls until it leaves the scattering volume 114 via one of the light emission faces 115, 116.

Figure 8:
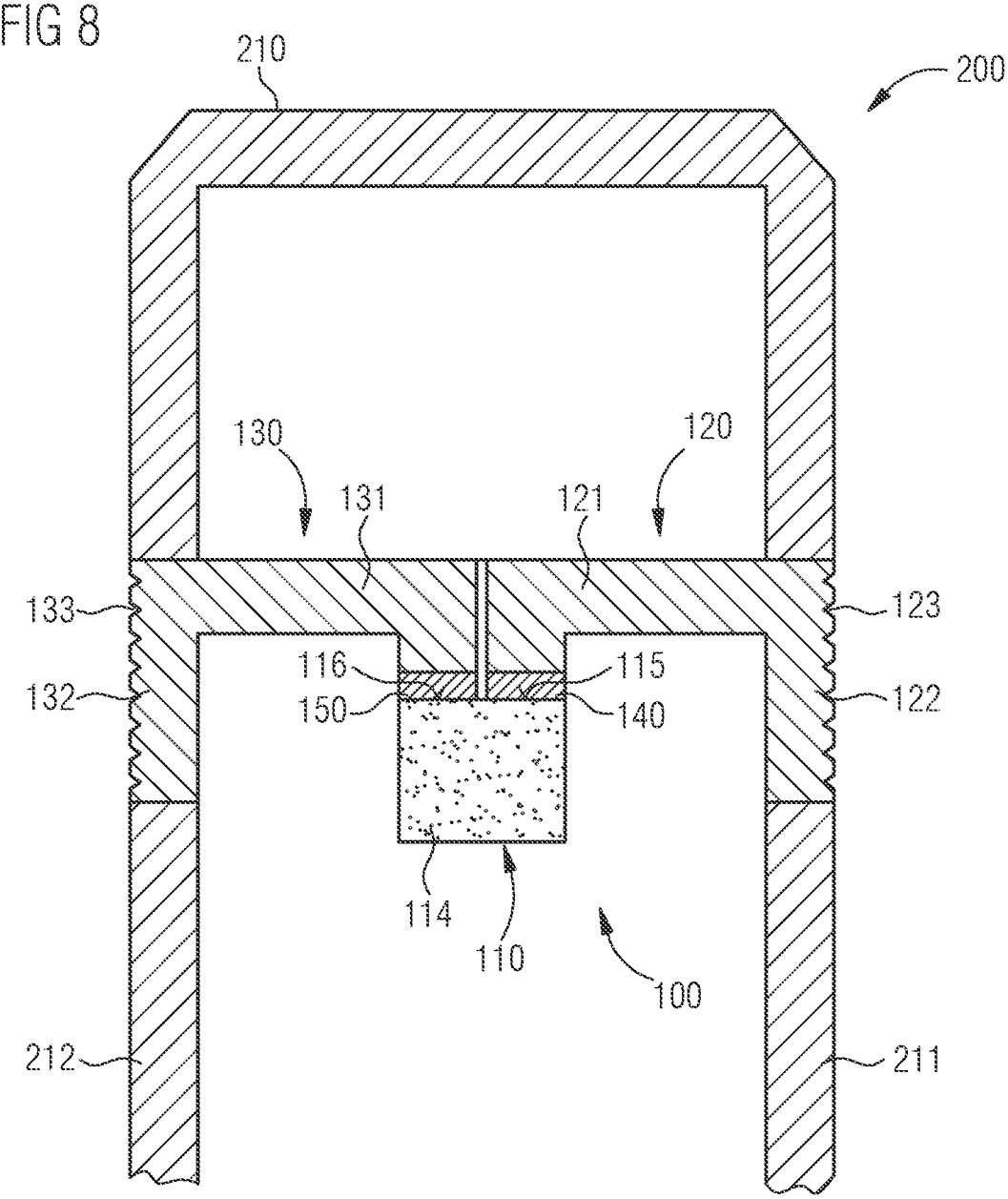
FIG. 8 schematically shows a cross-sectional illustration of an alternative configuration of the light-emitting lighting device, wherein the two flashlight functions are formed on a common side face of the light-emitting component.

In the exemplary embodiments shown hitherto, the light emission faces 115, 116 assigned to the different optical waveguide apparatuses 120, 130 are arranged respectively on two opposite sides of a cubic or parallelepipedal scattering volume 114. In principle, however, it is also possible to provide the two light emission faces on a common side of the scattering volume 114. In this respect, FIG. 8 shows a corresponding alternative configuration of the lighting device 100 of the mobile terminal 200. As is evident from FIG. 8, the two light emission faces 115, 116 are arranged jointly on the top face of the scattering volume 114. In this case, the remaining side walls of the scattering volume are preferably surrounded with a reflective material (not shown here). In the present case, the two light emission faces 115, 116 each occupy substantially half of the upper side face of the scattering volume 114. Alternatively, however, the second light emission face 116 may also occupy a larger proportion of the upper side face of the scattering volume 114 than the first light emission face 115, such that less light emerges through the first light emission face 115 than through the second light emission face 116. A lower luminous intensity of the front-side camera luminaire 122 in comparison with the rear-side camera luminaire 132 may be achieved as a result. As is furthermore shown in FIG. 8, the two optical switching apparatuses 140, 150 and the optical waveguide elements 121, 131 disposed optically downstream thereof are also arranged on the same side of the scattering volume 114.

Figure 9:
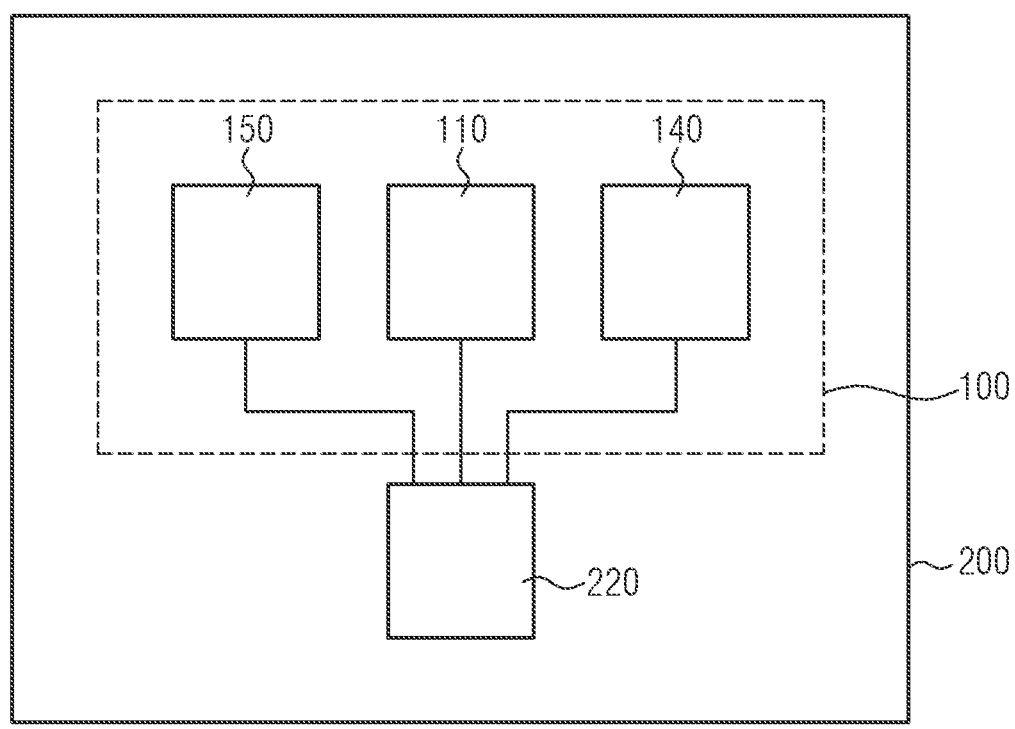
FIG. 9 shows a schematic illustration of the mobile terminal comprising the lighting device and a control apparatus for controlling the individual lighting functions.

In order to be able to operate the two lighting functions of the mobile terminal independently of one another, the two optical switching apparatuses 140, 150 of the lighting device 100 have to be controlled individually. This is carried out with the aid of a suitable control apparatus 220. In this respect, FIG. 9 shows a schematic illustration of the mobile terminal 200 comprising a lighting device 100 and a corresponding control device 220. In this case, the lighting device 100 comprises the light-emitting component no and the two optical switching apparatuses 140, 150, wherein the two optical switching apparatuses 140, 150 are connected to the common control apparatus 220. In the present exemplary embodiment, the control apparatus 220 is furthermore also responsible for controlling the light emission of the light-emitting component 110, such that the power of the light-emitting component can be adapted depending on the switching state of the two optical switching apparatuses 140, 150, depending on which of the two lighting functions of the mobile terminal 200 are currently being used.

In principle, it is also possible for the lighting device 100 also to be used for more than two lighting functions. In this regard, besides the camera luminaires described in the previous exemplary embodiments, in principle further luminaires of the mobile terminal, such as, for example, signal luminaires, display backlighting or the like, may also be coupled to the common light-emitting component no in an analogous manner. In order to guide light radiation from the scattering volume 114 to the radiation elements 122, 132 serving as luminaires, in principle other suitable concepts may also be used besides the optical waveguides 121, 131 used here. In this regard, it is possible, for example, to use reflective elements, for example, a light guiding channel constituted from reflective materials. A joint use of optical waveguides and reflection elements is also possible, in principle.

Moreover, it is possible, in principle, in particular in cases in which particularly high luminous intensities are required, to provide more than just one LED in the common light-emitting component.

In order to produce the light-emitting component 110 described here, in this case firstly an LED semiconductor chip may be bonded onto a substrate, e.g., by adhesive bonding or soldering. Afterward, the semiconductor chip is embedded into a first enclosure comprising silicone and phosphor (conversion material). The upper face and two side faces of said enclosure are subsequently covered by a light-reflecting layer. This may involve, e.g., a mixture of silicone and $TiO_2$.

By virtue of the specific reflector geometry, the light emission from the light-emitting component 110 is restricted to two opposite directions. By using optical waveguides and optically active elements, this makes it possible for light to be emitted from the desired sides of the mobile terminal. In principle, scattering volumes that are not cubic or parallelepipedal may also be used in this case.

The reflector constituted from a mixture of silicone and titanium dioxide in the previous exemplary embodiments may, however, also be obtained in some other way, for example, by coating the relevant side walls of the scattering volume with a reflective material. Furthermore, a separately produced reflector may also be used here.

Although the invention has been more specifically illustrated and described in detail by means of the preferred exemplary embodiment, nevertheless the invention is not restricted by the examples disclosed and other variations may be derived therefrom by the person skilled in the art, without departing from the scope of protection of the invention.

The invention claimed is:

1. A lighting device for a mobile terminal comprising:
   a light-emitting component comprising a light-emitting semiconductor element;
   a scattering volume comprising a first light emission face and a second light emission face, wherein the first light emission face is arranged opposite to the second light emission face,
   wherein the light-emitting semiconductor element is configured to emit radiation to a side face of the scattering volume, wherein the side face of the scattering volume is arranged between the first and second light emission face;
   a first optical waveguide configured to guide radiation from the first light emission face to a first radiation element;
   a second optical waveguide configured to guide radiation from the second light emission face to a second radiation element; and
   at least one optical switch arranged between a respective light emission face of the first or second light emission face and a respective optical waveguide of the first or second optical waveguide,
   wherein the at least one optical switch configured to control a quantity of radiation emitted from the light-emitting component via the respective light emission face,
   wherein the scattering volume comprises a square or rectangular profile, wherein the light-emitting semiconductor element is arranged at the side face of the scattering volume, and
   wherein the light-emitting semiconductor element configured to emit radiation in a direction crosswise to radiation emitting directions of the first and second light emission faces of the scattering volume.

2. The lighting device according to claim 1,
   wherein a first optical switch configured to control the quantity of radiation emitted from the light-emitting component via the first light emission face is arranged between the first light emission face and the first optical waveguide, and
   wherein a second optical switch configured to control the quantity of radiation emitted from the light-emitting component via the second light emission face is arranged between the second light emission face and the second optical waveguide.

3. The lighting device according to claim 1, wherein at least one of the first or second optical waveguide comprises an optical waveguide element arranged between a light emission face assigned to the respective optical waveguide and a radiation element of the respective optical waveguide.

4. The lighting device according to claim 1, wherein one of the first light emission face or the second light emission face comprises a semitransparent coating configured to reduce the quantity of radiation emitted via the respective light emission face.

5. The lighting device according to claim 1, further comprising a reflector comprising a reflective material, wherein the scattering volume comprises four side faces between the first and second light emission face, wherein the light-emitting semiconductor element is arranged at one of the four side faces of the scattering volume, and wherein the reflector covers the other three side faces of the scattering volume and limits radiation emission to the first and second light emission faces of the scattering volume.

6. The lighting device according to claim 1, further comprising a reflector comprising a reflective material, and wherein the reflector partly surrounds the scattering volume and is configured to limit radiation emission to the first and second light emission faces.

7. The lighting device according to claim 1, wherein the first radiation element constitutes a front-side camera light of a mobile terminal, and wherein the second radiation element constitutes a rear-side camera light of the mobile terminal.

8. The lighting device according to claim 1, wherein the light-emitting semiconductor element is an LED comprising a semiconductor chip arranged on a substrate and surrounded by an outer enclosure comprising a conversion material, and wherein the outer enclosure constitutes the scattering volume.

9. The lighting device according to claim 1, wherein the light-emitting semiconductor element is an LED comprising a semiconductor chip arranged on a substrate with a conversion element arranged on the semiconductor chip, and wherein the scattering volume is a scattering body arranged on the conversion element.

10. The lighting device according to claim 1, wherein the scattering volume comprises a recess adjacent to a side face, and wherein the light-emitting semiconductor element is arranged within the recess of the scattering volume.

11. The lighting device according to claim 10, further comprising a reflector comprising a reflective material, wherein the scattering volume comprises four side faces between the first and second light emission faces, wherein the light-emitting semiconductor element is arranged adjacent to one of the four side faces of the scattering volume, and wherein a reflector covers the other three side faces of the scattering volume and is configured to limit radiation emission to the first and second light emission faces of the scattering volume.

12. The lighting device according to claim 1, further comprising a reflector comprising a reflective material, wherein the light-emitting semiconductor element is arranged at the side face of the scattering volume, to which radiation is emitted by the light-emitting semiconductor element, wherein the light-emitting semiconductor element is configured to emit radiation in a direction crosswise, wherein the scattering volume comprises four side faces beside the first and second light emission face, wherein the light-emitting semiconductor element is arranged at one of the four side faces of the scattering volume, wherein the reflector covers the other three side faces of the scattering volume and is configured to limit radiation emission to the first and second light emission face of the scattering volume, and wherein the reflector covers two opposite sides of the light-emitting semiconductor element.

13. The lighting device according to claim 12, wherein a conversion material is arranged between the light-emitting semiconductor element and the scattering volume, wherein opposite sides of the conversion material are covered by the reflector, and wherein the reflector has a rectangular U-shape.

14. A mobile terminal comprising:
a housing; and
the lighting device according to claim 1 arranged in the housing, wherein the first radiation element is a camera light arranged on a front side of the mobile terminal, and wherein the second radiation element is a camera light arranged on a rear side of the housing.

15. A lighting device for a mobile terminal comprising:
a light-emitting component comprising a light-emitting semiconductor element;
a scattering volume comprising a first light emission face and a second light emission face, wherein the first light emission face and the second light emission face are arranged at a common first side face of the scattering volume, and wherein the light-emitting semiconductor element is configured to emit radiation to a second side face of the scattering volume;
a first optical waveguide configured to guide radiation from the first light emission face to a first radiation element;
a second optical waveguide configured to guide radiation from the second light emission face to a second radiation element;
at least one optical switch arranged between a respective light emission face of the first or second light emission face and a respective optical waveguide of the first or second optical waveguide, the at least one optical switch configured to control a quantity of radiation emitted from the light-emitting component via the respective light emission face; and
a reflector comprising a reflective material, wherein the scattering volume comprises a square or rectangular profile with six side faces, and wherein the reflector covers four side faces of the scattering volume and is configured to limit radiation emission to the light emission faces.

16. The lighting device according to claim 15, wherein the reflector comprises silicone including embedded titanium oxide.

17. The lighting device according to claim 15, wherein the first side face of the scattering volume and the second side face of the scattering volume are arranged side by side.

18. The lighting device according to claim 15, wherein the lighting device includes one single light-emitting semiconductor element.

* * * * *